US012118987B2

(12) United States Patent
Lu et al.

(10) Patent No.: US 12,118,987 B2
(45) Date of Patent: Oct. 15, 2024

(54) DIALOG DETECTOR

(71) Applicant: Dolby Laboratories Licensing Corporation, San Francisco, CA (US)

(72) Inventors: Lie Lu, Dublin, CA (US); Xin Liu, Beijing (CN)

(73) Assignee: Dolby Laboratories Licensing Corporation

( * ) Notice: Subject to any disclaimer, the term of this patent is extended or adjusted under 35 U.S.C. 154(b) by 240 days.

(21) Appl. No.: 17/604,379

(22) PCT Filed: Apr. 13, 2020

(86) PCT No.: PCT/US2020/028001
§ 371 (c)(1),
(2) Date: Oct. 15, 2021

(87) PCT Pub. No.: WO2020/214541
PCT Pub. Date: Oct. 22, 2020

(65) Prior Publication Data
US 2022/0199074 A1 Jun. 23, 2022

Related U.S. Application Data

(60) Provisional application No. 62/840,839, filed on Apr. 30, 2019.

(30) Foreign Application Priority Data

Apr. 18, 2019 (WO) ................ PCT/CN2019/083173
Aug. 20, 2019 (EP) .................................... 19192553

(51) Int. Cl.
*G10L 15/02* (2006.01)
*G10L 15/04* (2013.01)
(Continued)

(52) U.S. Cl.
CPC ............ *G10L 15/197* (2013.01); *G10L 15/02* (2013.01); *G10L 15/04* (2013.01); *G10L 15/22* (2013.01);
(Continued)

(58) Field of Classification Search
CPC ....... G10L 19/008; G10L 25/81; G10L 25/18; G10L 15/02; G10L 15/04; G10L 15/22; G10L 25/78; G10L 15/197; G10L 19/02
See application file for complete search history.

(56) References Cited

U.S. PATENT DOCUMENTS 6,785,645 B2 * 8/2004 Khalil ..................... G10L 25/81
704/E19.041
7,263,485 B2 8/2007 Wark
(Continued)

FOREIGN PATENT DOCUMENTS

JP 2011527445 A 10/2011
JP 2015184378 A 10/2015
(Continued)

OTHER PUBLICATIONS

Von Zeddelmann et al., ("A construction of MFCC-type features using short-time statistics for Applications in audio segmentation", 2009, 17th European Signal Processing Conference, IEEE, Aug. 24, 2009, pp. 1504-1508). (Year: 2009).*
(Continued)

*Primary Examiner* — Vijay B Chawan

(57) ABSTRACT

The present application relates to a method of extracting audio features in a dialog detector in response to an input audio signal, the method comprising dividing the input audio signal into a plurality of frames, extracting frame audio features from each frame, determining a set of context windows, each context window including a number of frames surrounding a current frame, deriving, for each
(Continued)

context window, a relevant context audio feature for the current frame based on the frame audio features of the frames in each respective context, and concatenating each context audio feature to form a combined feature vector to represent the current frame. The context windows with the different length can improve the response speed and improve robustness.

17 Claims, 8 Drawing Sheets

(51) Int. Cl.
*G10L 15/197* (2013.01)
*G10L 15/22* (2006.01)
*G10L 25/18* (2013.01)
*G10L 25/81* (2013.01)
*H04S 1/00* (2006.01)

(52) U.S. Cl.
CPC .............. *G10L 25/18* (2013.01); *G10L 25/81* (2013.01); *H04S 1/007* (2013.01); *H04S 2400/03* (2013.01)

(56) References Cited

U.S. PATENT DOCUMENTS

| | | | |
|---|---|---|---|
| 8,428,949 B2 | 4/2013 | Neoran | |
| 9,111,531 B2 | 8/2015 | Atti | |
| 9,196,249 B1* | 11/2015 | Konchitsky | ............. G10L 15/22 |
| 9,548,713 B2 | 1/2017 | Wang | |
| 9,613,640 B1 | 4/2017 | Balamurali | |
| 9,620,105 B2* | 4/2017 | Mason | .................... G10L 15/02 |
| 9,621,124 B2 | 4/2017 | Lu | |
| 9,805,725 B2* | 10/2017 | Crockett | ................... H04S 7/30 |
| 9,842,605 B2 | 12/2017 | Lu | |
| 9,972,334 B2 | 5/2018 | Subasingha | |
| 10,026,410 B2* | 7/2018 | Gurijala | ................ G10L 19/018 |
| 10,090,003 B2 | 10/2018 | Wang | |
| 2003/0101050 A1* | 5/2003 | Khalil | ..................... G10L 19/22 |
| | | | 704/E19.041 |
| 2004/0172244 A1 | 9/2004 | Oh | |
| 2008/0162121 A1* | 7/2008 | Son | ......................... G10L 19/22 |
| | | | 704/E19.041 |
| 2011/0119061 A1 | 5/2011 | Brown | |
| 2012/0041762 A1 | 2/2012 | Cooper | |
| 2015/0179168 A1* | 6/2015 | Hakkani-Tur | .......... G10L 15/22 |
| | | | 704/257 |
| 2016/0219387 A1* | 7/2016 | Ward | ..................... H04S 1/002 |
| 2016/0350410 A1 | 12/2016 | Aharoni | |
| 2016/0379627 A1* | 12/2016 | Yassa | ..................... G10L 25/78 |
| | | | 704/255 |
| 2017/0011754 A1 | 1/2017 | Choo | |
| 2017/0025119 A1* | 1/2017 | Song | ..................... G10L 15/197 |
| 2017/0092288 A1 | 3/2017 | Dewasurendra | |
| 2017/0249945 A1 | 8/2017 | Koppens | |
| 2018/0152803 A1 | 5/2018 | Seefeldt | |
| 2019/0221219 A1* | 7/2019 | Wang | ..................... G10L 19/00 |
| 2020/0273468 A1* | 8/2020 | Wang | ..................... G10L 19/00 |
| 2022/0191635 A1* | 6/2022 | Shlomot | ................. G10L 25/06 |

FOREIGN PATENT DOCUMENTS

| | | |
|---|---|---|
| KR | 101530481 B1 | 6/2015 |
| RU | 2016140453 A | 4/2018 |

OTHER PUBLICATIONS

Von Zeddelmann, Dirk et al "A Construction of Compact MFCC-Type Features Using Short-Time Statistics for Applications in Audio Segmentation" 17th European Signal Processing Conference, GlasGow, Scotland, Aug. 24-28, 2009.

Wichern, G. et al "Segmentation, Indexing, and Retrieval for Environmental and Natural Sounds" IEEE Transactions on Audio, Speech, and Language Processing, vol. 18, Issue 3, Mar. 2010, pp. 688-707.

* cited by examiner

DIALOG DETECTOR

CROSS-REFERENCE TO RELATED APPLICATIONS

This application claims priority to PCT Patent Application No. PCT/CN2019/083173, filed Apr. 18, 2019, U.S. Provisional Patent Application No. 62/840,839, filed Apr. 30, 2019, and EP Patent Application No. 19192553.6, filed Aug. 20, 2019, each of which is hereby incorporated by reference in its entirety.

TECHNICAL FIELD

The present application disclosure generally relates to audio signal processing and, in particular, to the dialog detector.

BACKGROUND

A dialog detector is a key component in a plurality of audio signal processing algorithms, such as, dialog enhancement, noise reduction and loudness meter. Generally, in the current dialog detector, the input audio signal is first converted to a uniform format in the pre-processing component by means of sampling rate conversion or down-mixing, etc. For example, as pre-processing, the input audio signal may be down-mixed to a mono audio signal. Next, the processed audio signal is split into short temporal frames, and audio features are extracted from a context window including a fixed number of frames to describe the characteristics of each frame. Then, a classifier, which is built using machine learning methods, is applied to automatically map the audio features to a confidence score that represents the probability of the presence of the dialog. At last, post-processing, such as a median or mean filter, can be applied to remove or smooth the undesired fluctuation of the obtained confidence scores. The signal will be classified as dialog in case that the confidence score is high. Then, the dialog signal may be sent to an audio improving device, such as a dialog enhancer.

SUMMARY

A first aspect of the invention relates to a method of extracting audio features in a dialog detector in response to an input audio signal, the method comprising dividing the input audio signal into a plurality of frames, extracting frame audio features from each frame, determining a set of context windows, each context window including a number of frames surrounding a current frame, deriving, for each context window, a relevant context audio feature for the current frame based on the frame audio features of the frames in each respective context, and concatenating each context audio feature to form a combined feature vector to represent the current frame.

The present invention thus proposes to use several context windows, each including a different number of frames, to represent a frame in different contexts, wherein the context windows with different length will play different roles in representing the audio property of the target frame. The context windows with the different length can improve the response speed and improve robustness. To this end, the present application introduces a new process, combo-term context determination, to determine a plurality, e.g. three, context windows with the different length or range, for example, a short-term context, a mid-term context and a long-term context; then the audio features are extracted in the contexts at the audio feature extraction component.

In some implementations, a frame feature extraction component extracts frame audio features (i.e. audio features of a frame) from each frame of a plurality of frames divided from the input audio signal, and a combo-term context determination component determines the length or range of each context window. Then, a relevant context audio feature is derived based on the frame audio features in each determined context. Each context audio feature is then concatenated and form a combined feature vector to represent a current frame.

In some implementations, the context windows includes a short-term context, a mid-term context and a long-term context. The short-term context represents the local information around the current frame. The mid-term context further contains a plurality of look-back frames. The long-term context further contains a plurality of long-term history frames.

In some implementations, the length or range of one or more contexts (i.e. the number of frames in the respective context windows) can be predetermined. For example, if a look-ahead buffer is available, the short-term context can contain the current frame and the look-ahead frames. The mid-term context can contain the current frame, the look-ahead frames and the look-back frames. The long-term context can contain the current frame, the look-ahead frames, the look-back frames and the long-term history frames. In one implementation, the length or range of the look-ahead frames can be predetermined as long as 23 frames, and the length or range of the look-back frames can be predetermined as long as 24 frames as well as the length or range of the long-term history frames can be predetermined as long as 48 to 96 frames. In another example, if the look-ahead buffer is not available, the short-term context can contain the current frame and a first portion of the look-back frames. The mid-term context can contain the current frame, the first portion of the look-back frames and a second portion of the look-back frames. The long-term context can contain the current frame, the first portion of the look-back frames, the second portion of the look-back frames and the long-term history frames. Therefore, the length or range of the first portion of the look-back frames can be predetermined as long as 23 frames, and the length or range of the second portion of the look-back frames can be predetermined as long as 24 frames as well as the length or range of the long-term history frames can be predetermined as long as 48 to 96 frames.

In some implementations, the length or range of one or more contexts can be adaptively determined by analyzing stationarity of frame-level feature. For example, the adaptive determination is based on information related to amplitude of the input audio signal. Specifically, one way to adaptively determine the length or range of the short-term context is based on strong onset or transient detection. In another example, the adaptive determination is based on information related to the spectrum of the input audio signal. Specifically, one way to adaptively determine the length or range of the short-term context is based on identifying the largest spectral inconsistency by using Bayesian Information Criteria. In addition, the short-term context can extend to both look-ahead and look-back directions, or extend to one direction only in the adaptive determination implementations. In some implementations, the length or range of the contexts can be predefined in combination with the adaptive determination.

In addition, the present application proposes a pre-cleaning method to remove uncorrelated noises in the signal, in order to improve the detection accuracy in low-SNR dialog. To this end, the present application utilizes downmixing with temporal-frequency dependent gains, with more emphasis on the correlated signal.

In some implementations, an input audio signal is first divided into a plurality of frames, and then, the frames in a left channel and a right channel are converted to spectrum representation of frames.

The uncorrelated signals in the left channel and the right channel are removed by applying the frequency dependent gains to the spectrum in the left channel and the right channel respectively, so as to obtain the signal after downmixing. In some implementations, the frequency dependent gains can be estimated from a covariance matrix.

Furthermore, the present application introduces a music content detector so that both the music confidence score and the speech confidence score can be jointly considered to correct the original dialog confidence score and obtain a final corrected dialog confidence score, so as to significantly reduce false alarms in music.

In some implementations, a speech content detector receives features extracted by using the context windows, and then, the speech content detector determines the speech confidence score.

Next, the music content detector receives features extracted by using the context windows, and then, the music content detector determines the music confidence score. The speech confidence score and the music confidence score are combined to obtain the final dialog confidence score. In some implementations, the final dialog confidence score can be refined by a context-dependent parameter which can be computed based on proportion of frames identified as speech or music in the history context. In some implementations, the history context can be as long as or longer than ten seconds.

BRIEF DESCRIPTION OF THE FIGURES

The included Figures are for illustrative purposes and serve only to provide examples of possible and operations for the disclosed inventive methods, system and computer-readable medium. These figures are in no way limit any changes in form and detail that may be made by one skilled in the art without departing from the spirit and scope of the disclosed implementations.

DETAILED DESCRIPTION

As mentioned above, in a conventional current dialog detector, each frame is represented by the context, namely, a window comprising a number of frames (such as 32 or 48 frames) and classified on the audio features extracted from frames in this context window. However, a problem with such a conventional dialog detector is that it may sometimes introduce large latency in detection since the detector can determine whether the dialog is present only after identifying several dialog frames which may have a negative impact on the real-time application. In addition, it cannot extract more robust rhythmic features which may contribute to discriminate speech from a singing voice or rap, and it may thus have a negative impact on the robustness in the dialog detection.

To address these problems, the present application discloses techniques that incorporate a set of different-length context windows to represent a frame on several scales, wherein the context windows with different length will play different roles in representing the audio property of the target frame. Some examples of methods, systems and computer-readable medium implementing said techniques for audio feature extraction of a dialog detector responsive to an input audio signal are disclosed as follows.

Figure 1:
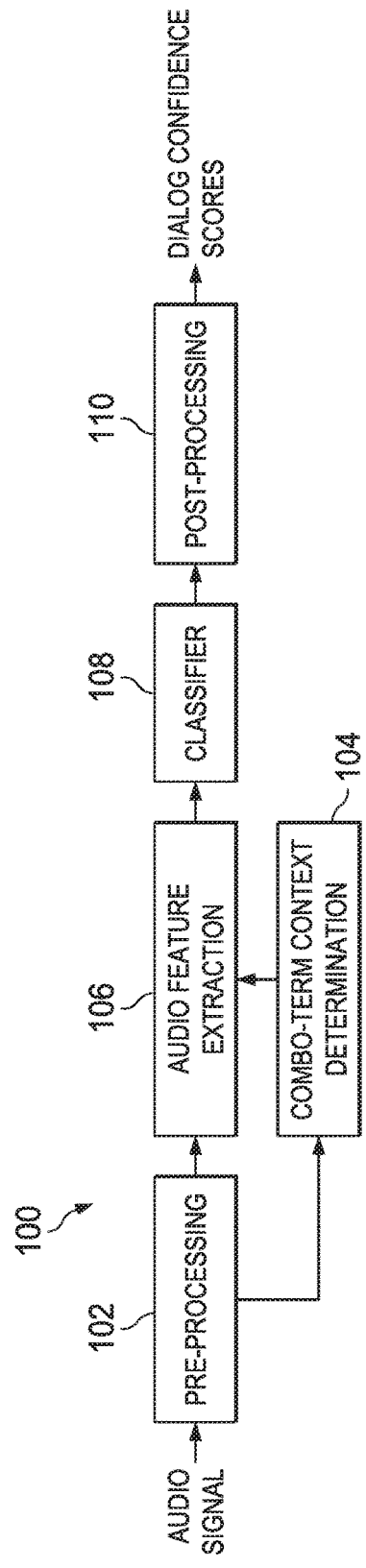
FIG. 1 shows a block diagram of a dialog detector 100 incorporating a combo-term context determination component 104, according to some implementations.

FIG. 1 depicts a block diagram of a dialog detector 100 incorporating a combo-term context window determination component 104, according to some implementations. In FIG. 1, a pre-processing component 102 receives an input audio signal. At the pre-processing component 102, the input audio signal may be down-mixed to a mono audio signal. It is then divided into the frames. Next, the combo-term context determination component 104 and an audio feature extraction component 106 receives the frames from the pre-processing component 102, respectively. Then, at the audio feature extraction component 106, the frame audio features are extracted from each frame. In addition, at the combo-term context determination component 104, the length or range of each context window is determined. The audio feature extraction component 106 then receives the determination result from the combo-term determination component 104. Next, at the audio feature extraction component 106, the frame audio features in each context window are used to derive each context feature depending on the determined context window. Each context feature set is then concatenated or combined and form the joint feature vector. Next, the classifier 108 receives the extracted feature vector from the audio feature extraction component 106. At the classifier 108, the confidence score that represents the probability of the presence of the dialog is obtained. Finally, at the post-processing component 110, the obtained confidence scores can be smoothed by, for example, a median filter or a mean filter, to remove the undesired fluctuation thereof.

Figure 2:
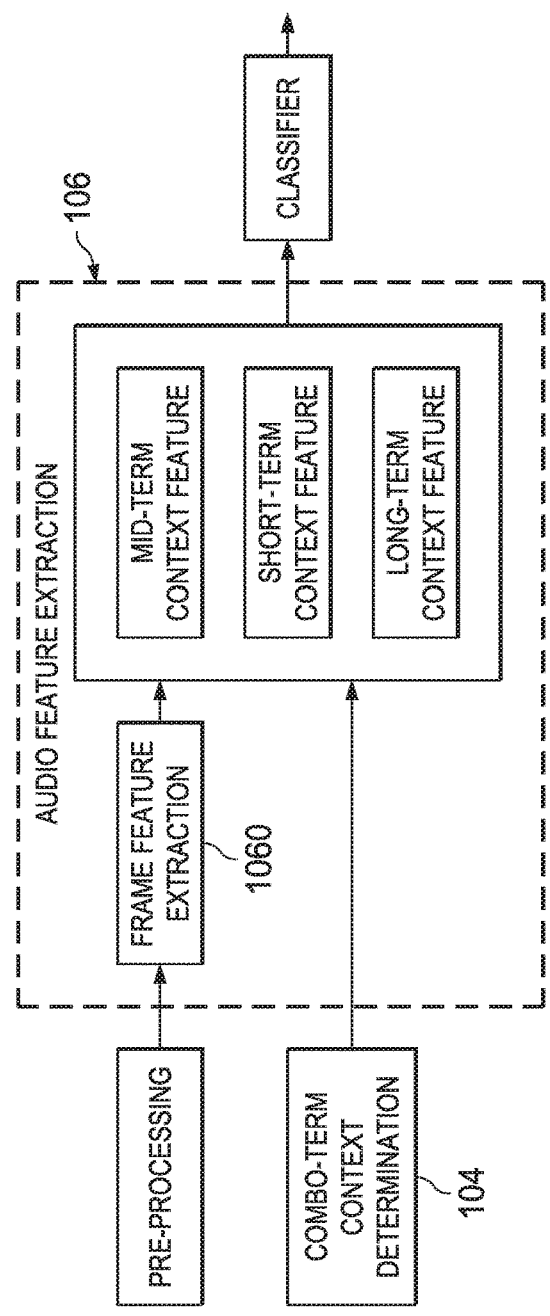
FIG. 2 shows a block diagram of the audio feature extraction component 102 in the dialog detector 100, according to some implementations.

FIG. 2 depicts a block diagram of the audio feature extraction component 106 in the dialog detector 100, according to some implementations. Specifically, it describes the combo-term context feature extraction and combination. In FIG. 2, at the audio feature extraction component 106, the frame audio features are extracted from each received frame by means of a frame feature extraction component 1060. Then, at the combo-term context determination component 104, the length or range of each context window, in this case a short-term context window, a mid-term context window and a long-term context window is determined. Next, a short-term context audio feature, a mid-term context audio feature and a long-term context audio feature are derived based on the frame audio features in the short-term context window, the mid-term context window and the long-term context window, respectively. Finally, these three context feature sets are concatenated and form a large-dimensional feature vector. For example, supposing each context feature is 100 dimensional, then the concatenated feature will be 300 dimensional.

Therefore, rather than one context window to represent the current frame, the present application uses a plurality of context windows. In one embodiment, there are three context windows, namely, the short-term context window, the mid-term context window and the long-term context window with the different length or range, to represent the current frame. In particular, the short-term context represents the local information around the target frame so that the detector may respond faster when the dialog appears. The mid-term context is the counterpart used in the existing detector since it can provide a reasonable temporal span for the audio content analysis. The long-term context window represents more global information in which only the rhythmic features are extracted since short-term context or the mid-term context window is typically not long enough to extract robust rhythmic features. That is, the present application adds the short-term context window to improve response speed and the long-term context to improve robustness. Thus, the length of these three context windows should be determined during the feature extraction. To this end, the present application introduces the combo-term determination component to determine the length of the short-term context window, the mid-term context window and the long-term context window.

In an example, a frame audio feature may comprise at least one of sub-band features or full band features. Examples of sub-band features include: sub-band spectral energy distribution, sub-band spectral contrast, sub-band partial prominence, Mel-frequency cepstral coefficients (MFCC), MFCC flux and bass energy. Examples of full band features include: spectral flux, spectral residual and short-time energy.

In an example, a context audio feature may be derived from one or more frame audio feature. For example, a context audio feature may include statistics of frame audio features, such as mean, mode, median, variance or standard deviation.

Additionally or alternatively, a context audio feature may include a rhythm-related feature, such as a 2D modulation feature, rhythm strength, rhythm clarity, rhythm regularity, average tempo and/or window-level correlation (i.e. context-level correlation).

The aforementioned examples of frame audio features and context audio features are not exhaustive and various other frame audio features and context audio features may be used instead or in addition to the listed features.

Figure 3:
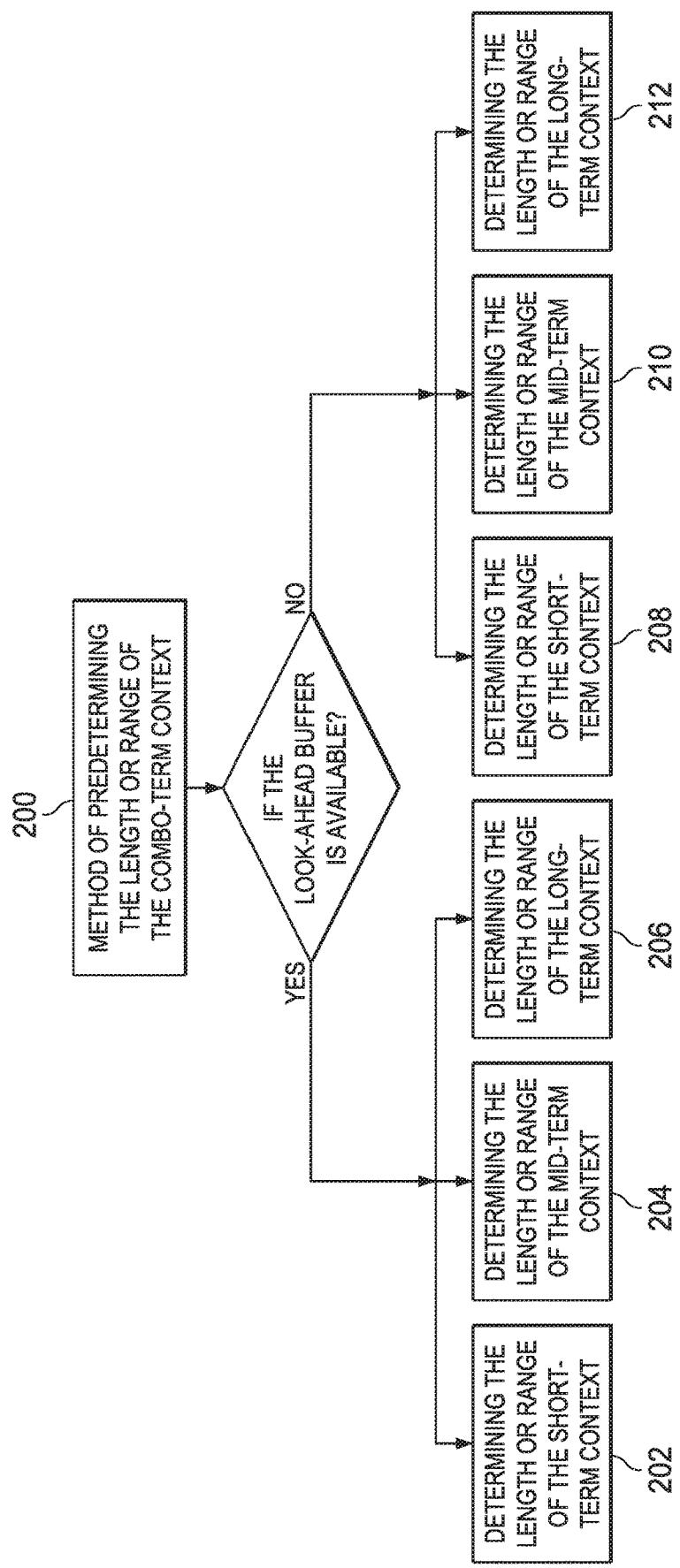
FIG. 3 shows a flow chart of a method 200 of some implementations for predetermining the length or range of the combo-term context by using the combo-term context determination component 104.
Figure 4A:
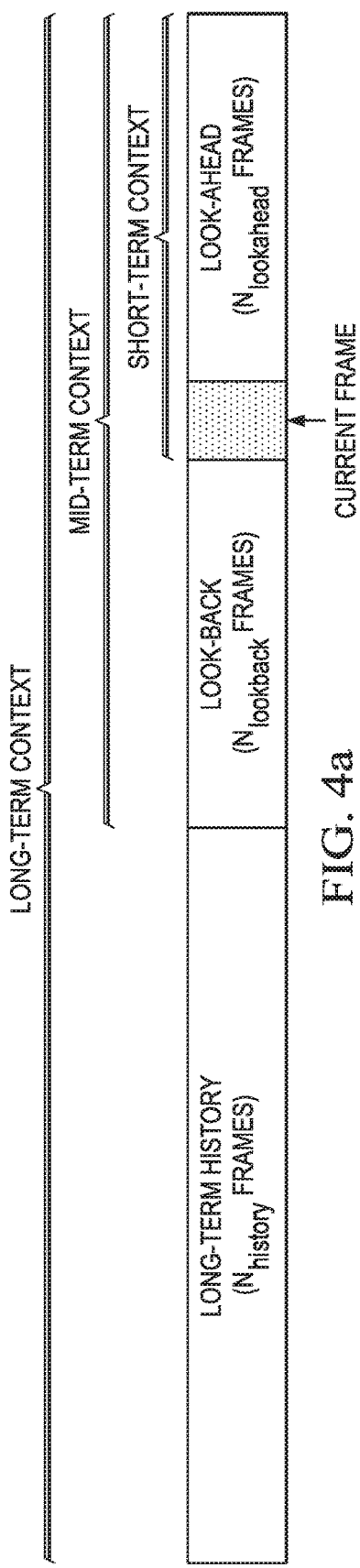
FIG. 4a shows an example of the predetermined length or range of the combo-term context if the look-ahead buffer is available, according to some implementations.
Figure 4B:
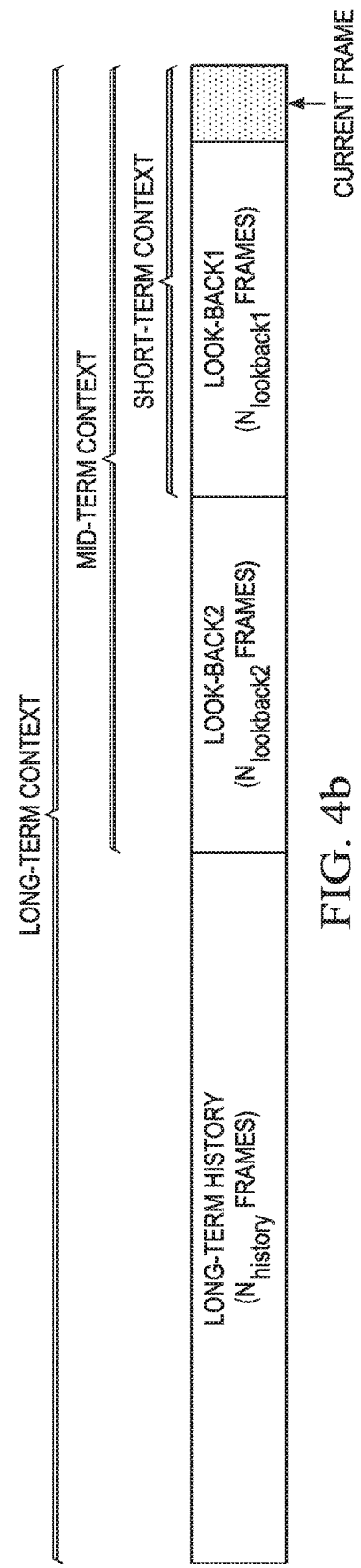
FIG. 4b shows an example of the predetermined length or range of the combo-term context if the look-ahead buffer is not available, according to some implementations.

FIG. 3 shows a flow chart of a method 200 of some implementations for predetermining the length or range of the combo-term context by using the combo-term context determination component 104. In this exemplary embodiment, the length or range of combo-term contexts can be pre-determined. In one example, if a look-ahead buffer is available, at 202, the short-term context can be determined to only contain the current frame and a few look-ahead frames wherein the length or range of look-ahead frames can be pre-defined as 23 frames, thus, the total length or range of the short-term context is 24 frames, so as to analyze the most recent coming content. At 204, the mid-term context can be determined to contain the current frame, a few look-ahead frames and a few look-back frames wherein the length or range of look-back frames can be pre-defined as 24 frames, thus, the total length or range of the mid-term context is 48 frames. Next, at 206, the long-term context can be determined to contain the current frame, a few look-ahead frames, a few look-back frames and more history frames wherein the length or range of the long-term history frames can be pre-defined as from 48 to 96 frames, thus, total length or range of the long-term context is from 96 frames to 144 frames, so as to have a stable rhythmic feature analysis. FIG. 4a shows this example of the predetermined length or range of the combo-term context. In another example, if the look-ahead buffer is not available, at 208, the short-term context can be determined to only contain the current frame and portion of look-back frames wherein the length or range of the portion of look-back frames can be pre-defined as 23 frames, thus, the total length or range of the short-term context is 24 frames. At 210, the mid-term context can be determined to contain the current frame, portion of the look-back frames and further look-back frames wherein the length or range of the further look-back frames can be pre-defined as 24 frames, thus, the total length or range of the mid-term context is 48 frames. Next, at 212, the long-term context can be determined to contain the current frame, the portion of look-back frames, the further look-back frames and more history frames wherein the length or range of the long-term history frames can be pre-defined as from 48 to 96 frames, thus, the total length or range of the long-term context is from 96 frames to 144 frames. FIG. 4b shows this example of the predetermined length or range of the combo-term context. In the method 200, the length or range of the look-ahead buffer, the look-back buffer and the long-term history can be all pre-defined. Alternatively, apart from the above number of frames, the other number of frames can be used as long as it ensures that the short-term context only contains the frames with the similar property as the current frame and the long-term context contains the enough history frames to extract robust rhythmic features.

Figure 5A:
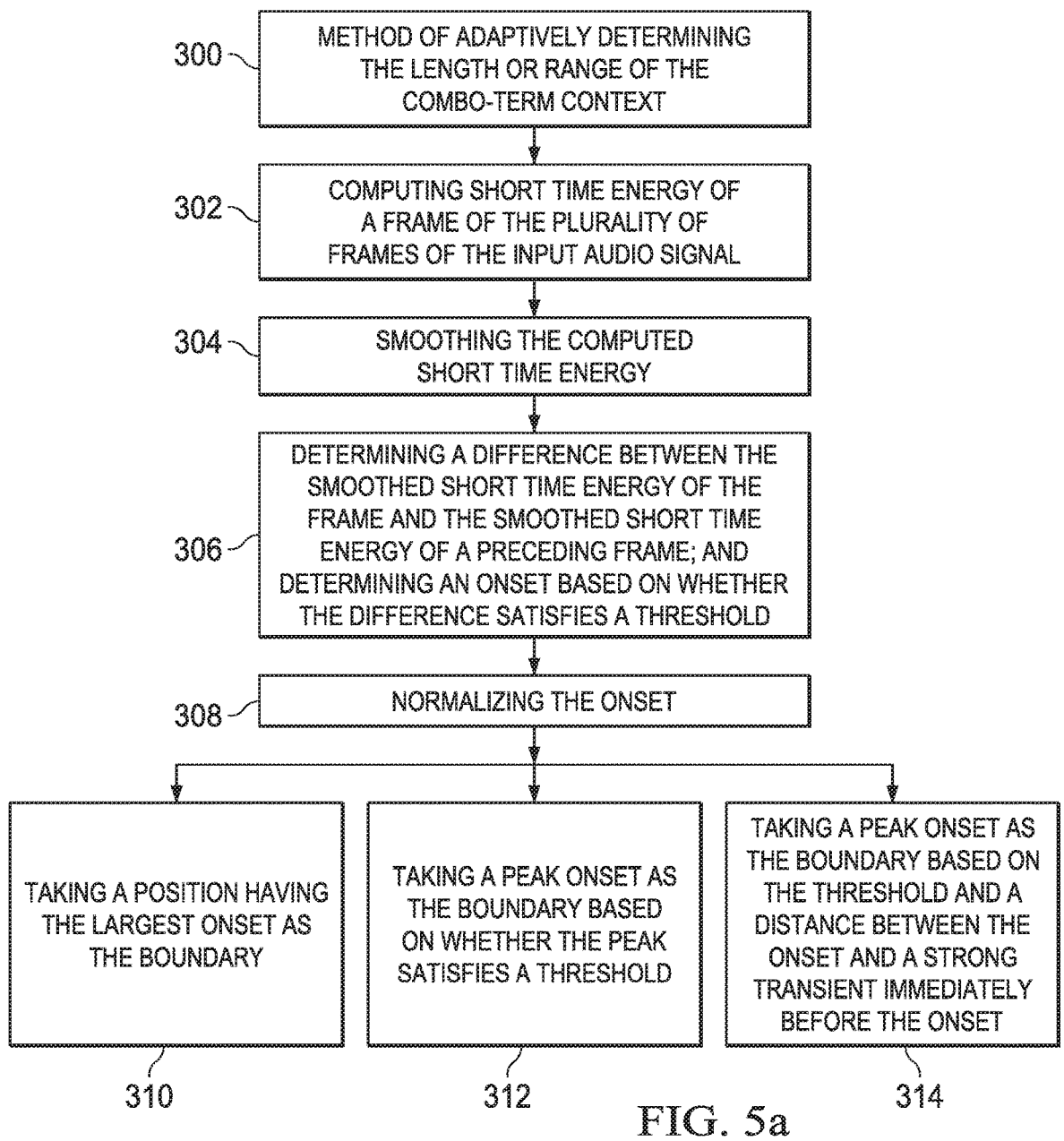
FIG. 5a shows a flow chart of an example of a method 300 of some implementations for adaptively determining the length or range of the combo-term context by using the combo-term context determination component 104.

Alternatively, the length or range of one or more context windows can be adaptively determined in the combo-term context determination component 104 by analyzing stationarity of frame-level features and grouping audio frames accordingly. FIG. 5a depicts a flow chart of an example of a method 300 of some implementations for adaptively determining the length or range of the combo-term context window by using the combo-term context determination component 104. In particular, it takes the short-term context as an example to describe the method 300. The method 300 is based on strong transient detection. Firstly, at 302, the short time energy S(k) of frame k is computed with the following equation (1):

$$S(k) = \frac{1}{N}\sum_{n=0}^{N-1} x_{k,n}^2 \qquad (1)$$

Where $[x_{k,0}, \ldots, x_{k,N-1}]$ is the PCM samples of the frame k. The samples can be also windowed/weighted before computing energy, and the energy can be derived from either full-band or sub-band signal.

Then, at 304, the frame energy S(k) is smoothed asymmetrically, with fast tracking coefficient when energy increase and a slow decay when energy decrease, as represented in equation (2):

$$\tilde{S}(k) = \begin{cases} S(k) & \text{if } S(k) > \tilde{S}(k-1) \\ \alpha\tilde{S}(k-1) + (1-\alpha)S(k) & \text{otherwise} \end{cases} \qquad (2)$$

where $\tilde{S}(k)$ is the smoothed short-term energy in the $k^{th}$ audio frame. The parameter $\alpha$ is the smoothing factor.

Next, at 306, a difference filter is applied on the smoothed energy envelope, and the values exceeding a given threshold $\delta$ can be considered as onset $E_{onset}(k)$, as represented in equation (3):

$$E_{onset}(k) = \begin{cases} \tilde{S}(k) - \tilde{S}(k-1) & \text{if } \tilde{S}(k) - \tilde{S}(k-1) \geq \delta \\ 0 & \text{otherwise} \end{cases} \qquad (3)$$

Figure 5B:
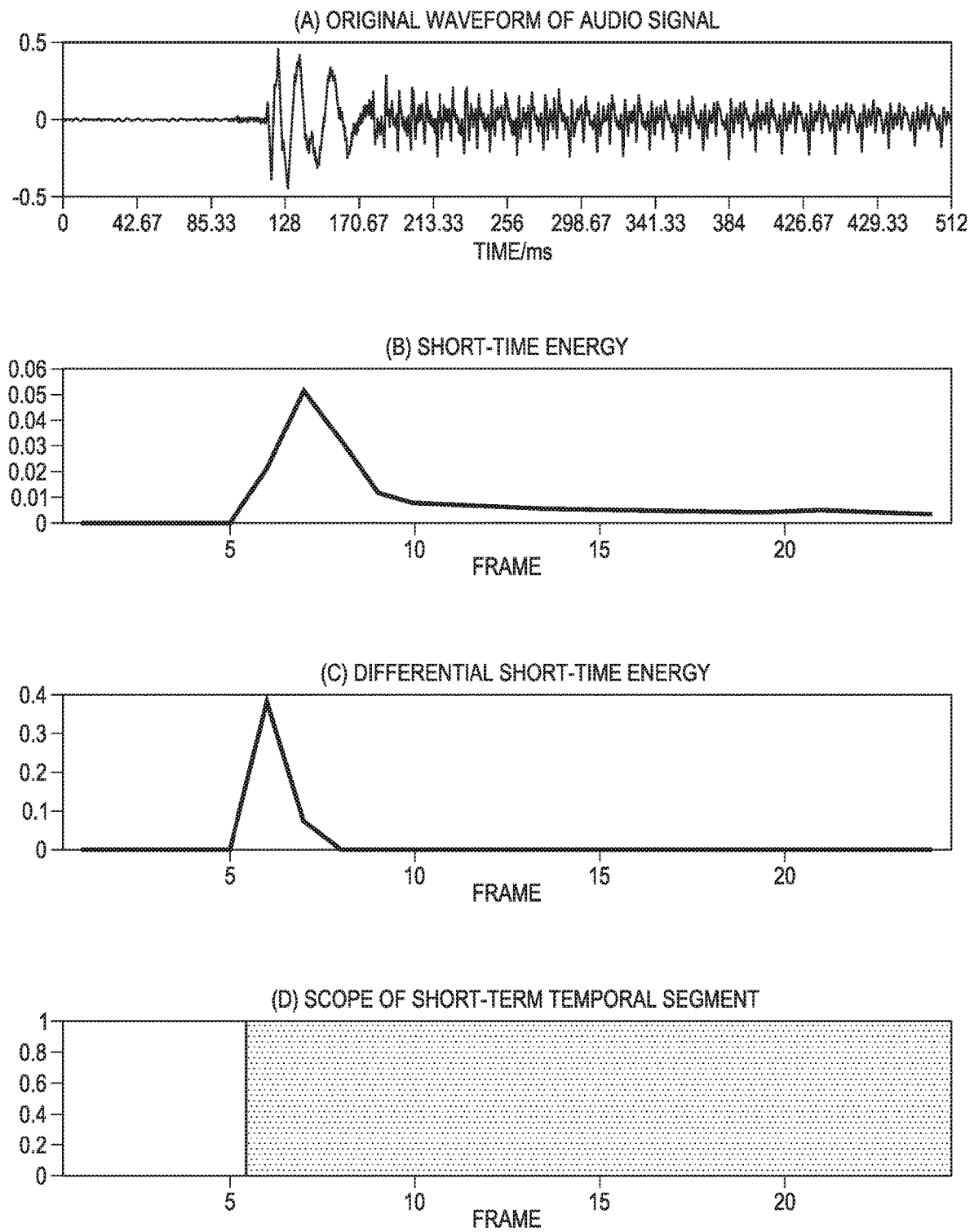
FIG. 5b shows a schematic view of the method 300 illustrated in the context boundary search range.

Then, at 308, $E_{onset}(k)$ may be further normalized with the average value of short-term energy in the search range. Next, a boundary for the length or range of the short-term context can be determined at either 310, 312 or 314. At 310, the position with the largest $E_{onset}(k)$ will be taken as the context boundary. At 312, the peak $E_{onset}(k)$ above a certain threshold, such as 0.3 (it may be tuned between 0 to 1), can be picked up as the context boundary. Instead of threshold, at 314, a distance between the $E_{onset}(k)$ and a previously identified strong peak can be considered. That is to say, only when it has a certain distance, such as one second, from the preceding strong transient, it will be determined as a strong transient and picked up as the context boundary. In addition, at 314, if there is no strong transient found in the search range, the whole look-back frames and/or the look-ahead frames will be used. FIG. 5b depicts a schematic view of the method 300 illustrated in the context boundary search range. In particular, it illustrates the original waveform of the audio signals, the short-time energy, the differential short-time energy after normalization and the scope of the determined short-term context.

Figure 6A:
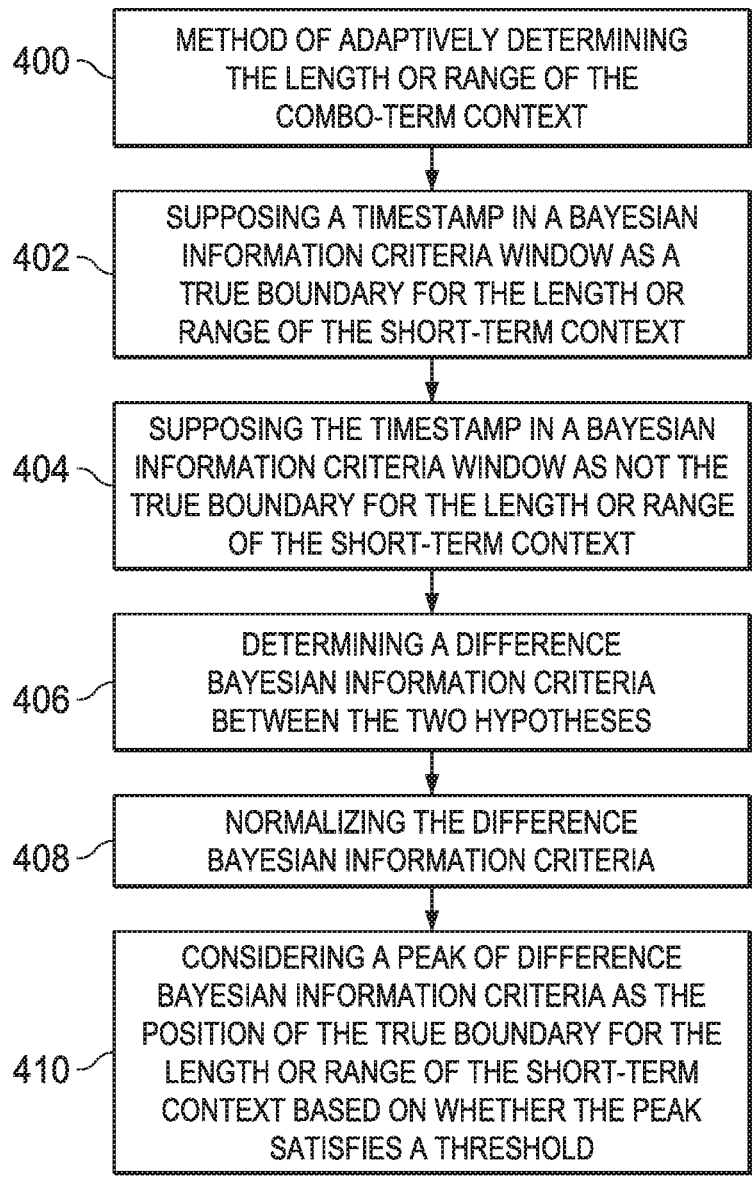
FIG. 6a shows a flow chart of another example of a method 400 of some implementations for adaptively determining the length or range of the combo-term context by using the combo-term context determination component 104.
Figure 6B:
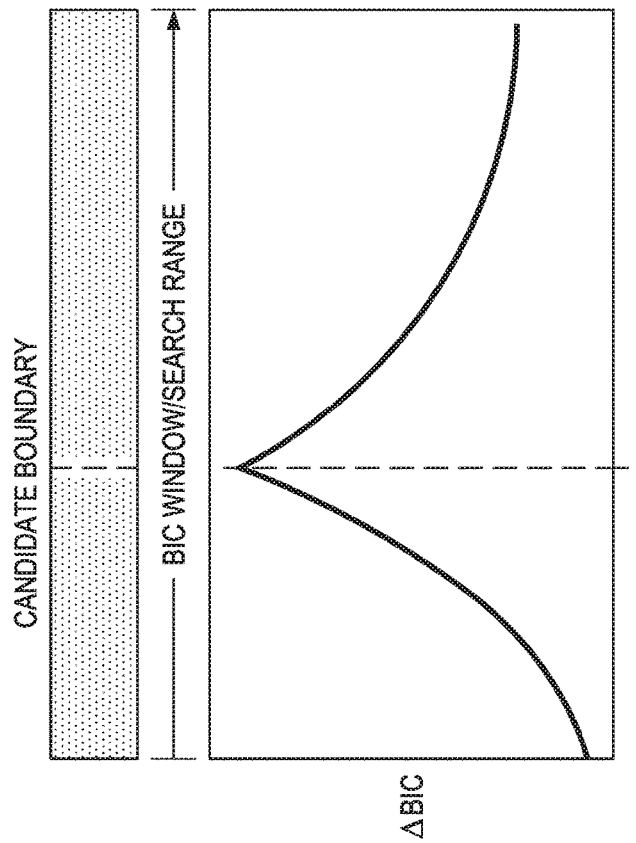
FIG. 6b shows a schematic view of the method 400 illustrated in the Bayesian Information Criteria window.

Instead of using the amplitude information to determine the scope of the context, the adaptive determination of the scope of the context can also be based on the spectral information. For example, the largest spectral inconsistency can be found to determine the scope of the context by using Bayesian Information Criteria (BIC). FIG. 6a depicts a method 400 of BIC-based boundary determination. It also takes the short-term context as an example to describe the method 400. Firstly, at 402, the timestamp tin a BIC window is supposed to be the true boundary and it is better to represent the window by two separated Gaussian models that are split at time t. Then, at 404, the timestamp tin a BIC window is supposed not to be the true boundary and it is better to represent the window by only one Gaussian model. Next, at 406, the delta BIC is computed with the following equation (4):

$$\Delta BIC(t) = BIC(H_0) - BIC(H_1) \qquad (4)$$

Where $H_0$ is the hypothesis at 402 and $H_1$ is the hypothesis at 404. FIG. 6b shows an example $\Delta BIC(t)$ curve in the BIC window which is the log likelihood difference between the two hypotheses. Then, at 408, the delta BIC may be normalized. Next, at 410, if the peak of $\Delta BIC(t)$ is larger than a threshold (it may be tuned between 0 to 1), the peak can be chosen as the most possible position of the context boundary.

Figure 7:
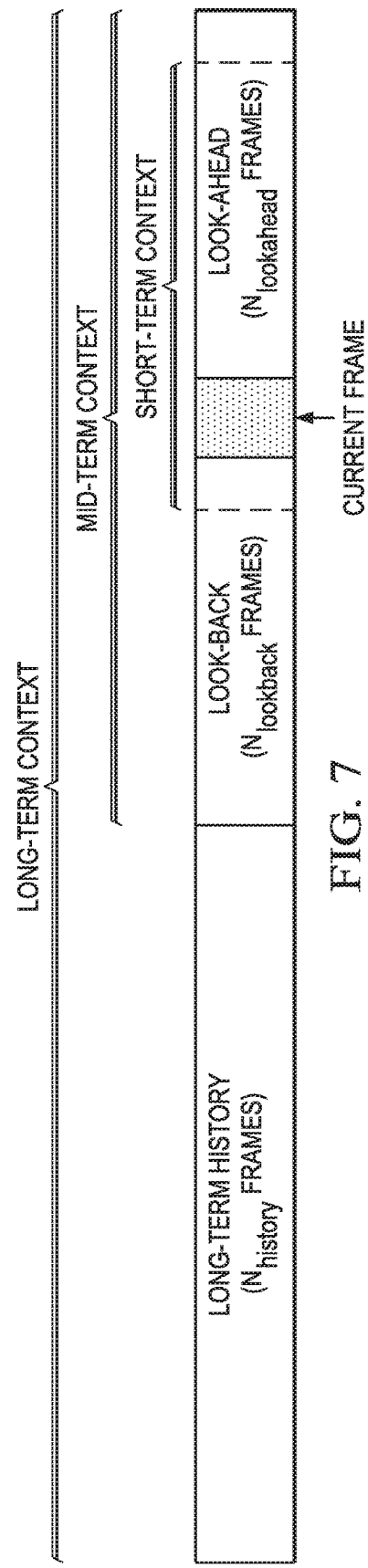
FIG. 7 shows an example of the adaptively determined length or range of the combo-term context if the look-ahead buffer is available, according to some implementations.

FIG. 7 shows an example of adaptively determining a length or range of the combo-term context window if the look-ahead buffer is available, according to some implementations. In particular, the length or range of the short-term context window is adaptively determined based on the method 300 or method 400, and the length or range of the mid-term context and the long-term context are predefined based on the method 200. As shown in FIG. 7, the short-term context can extend to both the look-ahead direction and the look-back direction if the look-ahead buffer is available. Alternatively, the short-term context can only extend to the one direction, for example, if the look-ahead buffer is not available (not shown). The method 300 or method 400 according to the present application takes the short-term context as an example to describe the adaptive determination, however, the length or range of the mid-term can also be adaptively determined in the similar ways as the above method 300 or 400.

As above mentioned, current dialog detector is applied to a mono downmix on L/R for a stereo signal or on L/R/C for a 5.1 signal, in order to reduce the computational complexity. However, mixing all the channels together may reduce the SNR of dialog and harm dialog detection accuracy. For example, dialog with large noise (such as, in sports games) or dialog in intensive action scenes may be missed in detection. To address this problem, a Center channel dominant downmix, as represented in equation (5), is applied to reduce the dialog smearing since most of dialog is in channel C in 5.1 signal.

$$M = 0.707C + g(L+R)/2 \qquad (5)$$

Where C, L, R stands for the complex-valued spectrum for every temporal-spectral tile (that is, for every frame and every bin/band) in the center, left and right channel respectively, and g is a parameter between 0 and 1 to reduce the contribution from L and R. However, the above method works on the 5.1 signal but is not applicable to the stereo signal since the dialog is generally considered as a panned signal, thus, correlated in L and R, in the stereo signal.

Figure 8:
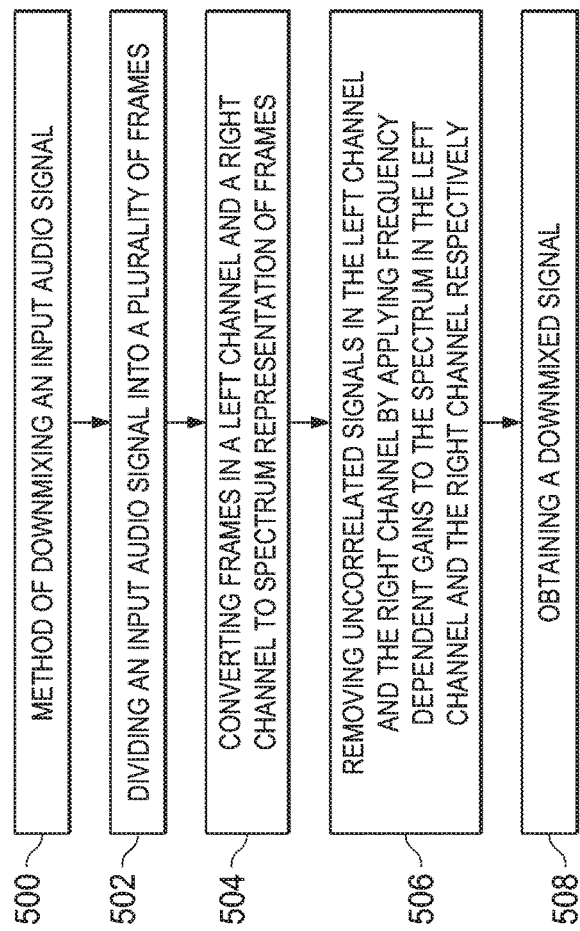
FIG. 8 shows a flow chart of an example of a method 500 of downmixing an input audio signal of dialog detector, performed according to some implementations.

To address this problem, the present application proposes a new downmixing method to remove uncorrelated noise in the signal, so as to make the dialog more pronounced after downmixing. FIG. 8 depicts an example of a method 500 of downmixing an input audio signal of dialog detector, performed according to some implementations. Firstly, at 502, an input audio signal is divided into a plurality of frames. Then, at 504, the frames in a left channel and a right channel are converted to spectrum representation of frames. Next, at 506, uncorrelated signals are removed by the equation (6) as follows:

$$M = g_1 L + g_2 R \qquad (6)$$

Where L is the spectrum representation of frames in the left channel and R is the spectrum representation of frames in the right channel, and $g_1$ and $g_2$ are two frequency dependent gains, rather than wide-band gains, applied to L and R, respectively. For simplicity, the annotation on frequency band in the equation is ignored. In one implementation, $g_1$ and $g_2$ can be estimated from a covariance matrix which is computed for every band in a certain duration (wherein only the real part is considered and the annotation on the frequency band is ignored as well), as represented in equation (7):

$$\text{Cov} = \begin{bmatrix} |L|^2 & \text{re}(Lr^*) \\ \text{re}(Lr^*) & |R|^2 \end{bmatrix} \quad (7)$$

Then, following eigenvector analysis and the idea of ambience extraction in NGCS, $g_1$ and $g_2$ can be represented as follows.

$$g_1 = \frac{\sqrt{4c^2 + (a-d)^2} + (a-d) + c}{4(a+d)} \quad (8)$$

$$g_2 = \frac{\sqrt{4c^2 + (a-d)^2} - (a-d) + c}{4(a+d)} \quad (9)$$

Where a, c and d are the alternative representation of the covariance coefficients $|L|^2$, $\text{re}(LR^*)$ and $|R|^2$, respectively, in order to simplify the representation of equations (8) and (9). After 506, the signal after downmixing M will be obtained at 508.

Although the above method 500 is described and developed based on a stereo signal, it could be also applicable to a 5.1 signal. In one implementation, the 5.1 signal may first be converted to the stereo signal ($L_c$ and $R_c$) with a center-dominant downmix, as represented in equations (10) and (11):

$$L_c = 0.707C + gL \quad (10)$$

$$R_c = 0.707C + gR \quad (11)$$

Then, the $L_c$ and $R_c$ will follow the method 500 to remove the uncorrelated noise.

In addition to or instead of the method 500 of removing uncorrelated signal, some other methods can also be applied. In some implementations, a method similar to echo cancellation can be applied to reduce the noise in the center channel C by using (L+R)/2 as a reference noise signal. Alternatively, NMF spectral basis may be built for either dialog or both dialog and noise and they may be applied to extract clean dialog component.

Moreover, in the current detector, the music signal, especially, singing voice in A-Capella (without much music background) or rap sharing a lot of similar properties as dialog, may be misclassified as dialog, therefore, the false alarms may significantly increase. The applicant finds that the music confidence score is also high for the same misclassified frames. Therefore, the applicant introduces a music classifier in parallel to the dialog detector, so that the music confidence score can be used as a reference to refine or correct the original dialog confidence score, so as to considerably reduce the false alarms in music.

Figure 9:
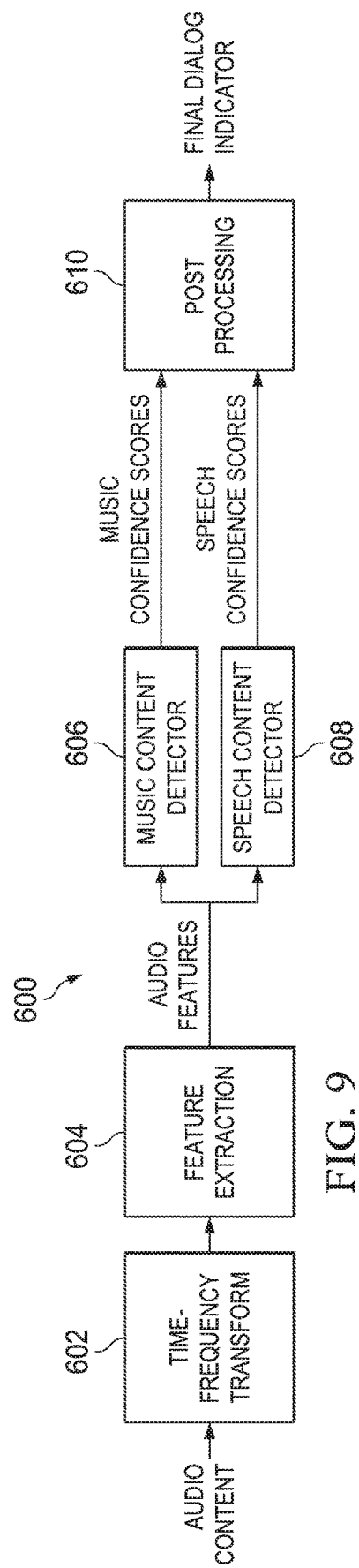
FIG. 9 shows a block diagram of a dialog detector 600 further integrating a music content detector 606, according to some implementations.

FIG. 9 shows a block diagram of a dialog detector 600 further integrating a music content detector 606, according to some implementations. Firstly, an input audio signal is divided into a plurality of frames and converted to the spectrum representation by Discrete Fourier Transform (DFT) 602. Then, at a feature extraction component 604, features are extracted to represent every frame according to a procedure illustrated by FIG. 2. Next, the music content detector 606 receives the extracted features to obtain a music confidence score $C_m(t)$; meanwhile, the speech content detector 608 also receives the extracted features to obtain a speech confidence score $C_s(t)$. In addition, the music confidence score $C_m(t)$ and the speech confidence score $C_s(t)$ may be further smoothed by a median filter or a mean filter. Moreover, at a post processing component 610, the music confidence score $C_m(t)$ and the speech confidence score $C_s(t)$ are combined to obtain the final dialog confidence score $\tilde{C}_s(t)$. In particular, the original dialog confidence score will be refined to obtain the refined final dialog confidence score $\tilde{C}_s(t)$ at the post processing component 610. In general, the original dialog confidence score can be reduced by some extent if the music confidence score $C_m(t)$ is also high for the same frame. However, it may over-decrease the speech confidence score $C_s(t)$ since a real dialog content may also generate both high dialog confidence score and high music confidence score if the dialog is present with music background. To address this problem, a history context can be applied to determine whether the music confidence score $C_s(t)$ can be confidently used to refine the dialog confidence score. If the history context is dialog dominant, it will be more conservative to refine the dialog confidence score, that is, intending to ignore the music confidence score. Therefore, in some implementations, the final dialog confidence score $\widetilde{C_s}(t)$ is refined by the following equation (12):

$$\tilde{C}_s(t) = C_s(t) * (1 - \beta * C_m(t)) \quad (12)$$

Where $\tilde{C}_s(t)$ is the refined dialog confidence score at frame t, $C_s(t)$ is the speech confidence score, $C_m(t)$ is the music confidence score and $\beta$ is a context-dependent parameter controlling how much the music confidence score impacts the final dialog confidence score. In one implementation, $\beta$ is computed based on the proportion of the frames identified as speech or music in the history context. For example, $\beta$ can be set to the ratio of the frames identified as music in the history context with a simple binary method. In particular, $\beta$ can be set to one if the context is music dominant, and $\beta$ can be set to zero if the context is dialog dominant, as represented in equation (13):

$$\beta = \begin{cases} 1 & \frac{N_m}{N} \geq r_{th} \\ 0 & \frac{N_m}{N} < r_{th} \end{cases} \quad (13)$$

Where $N_m$ is the number of music frames and N is the overall frames in the history context; $r_{th}$ is a threshold, typically set to 0.5, but the threshold can be also tunable between 0 and 1 depending on how aggressive the music frames take effect. Alternatively, $\beta$ may be represented as a continuous function, for example, as a linear function as illustrated in equation (14), or as a sigmoid function as illustrated in equation (15):

$$\beta = r = \frac{N_m}{N} \quad (14)$$

$$\beta = \frac{1}{1 + e^{-a(r - r_{th})}} \quad (15)$$

Where a is a scale factor that controls the shape of sigmoid function, and can be set to 5 in the present application. In addition, the history context used in estimation of a context-dependent parameter β can be much longer than the history frames used for long-term feature extraction, for example, the length or range of the history context can be set to 10 seconds or even longer.

The techniques of the dialog detector described herein could be implemented by one or more computing devices. For example, a controller of a special-purpose computing device may be hard-wired to perform the disclosed operations or cause such operations to be performed and may include digital electronic circuitry such as one or more application-specific integrated circuits (ASICs) or field programmable gate arrays (FPGA) persistently programmed to perform operations or cause operations to be performed. In some implementations, custom hard-wired logic, ASICs and/or FPGAs with custom programming are combined to accomplish the techniques.

In some other implementations, a general purpose computing device could include a controller incorporating a central processing unit (CPU) programmed to cause one or more of the disclosed operations to be performed pursuant to program instruction in firmware, memory, other storage, or a combination thereof.

The term "computer-readable storage medium" as used herein refers to any medium that storage instructions and/or data that cause a computer or type of machine to operate in a specific fashion. Any of the models, detector and operations described herein may be implemented as or caused to be implemented by software code executable by a processor of a controller using suitable computer language. The software code may be stored as a series of instructions on a computer-readable medium for storage. Example of suitable computer-readable storage medium include random access memory (RAM), read only memory (ROM), a magnetic medium, optical medium, a solid state drive, flash memory, and any other memory chip or cartridge. The computer-readable storage medium may be any combination of such storage devices. Any such computer-readable storage medium may reside on or within a single computing device or an entire computer system, and may be among other computer-readable storage medium within a system or network.

While the subject matter of this application has been particularly shown and described with reference to implementations thereof, it will be understood by those skilled in the art that changes in the form and details of the disclosed implementations may be made without departing from the spirit or scope of this disclosure. Examples of some of these implementations are illustrated in the accompany drawings, and specific details are set forth in order to provide a thorough understanding thereof. It should be noted that implementations may be practiced without some or all of these specific details. In addition, well known features may not have been described in detail to promote clarity. Finally, although advantages have been discussed herein with reference to some implementations, it will be understood that the scope should not be limited by reference to such advantages. Rather, the scope should be determined with reference to the appended claims.

Various aspects of the present invention may be appreciated from the following enumerated example embodiments (EEEs):

1. A method of extracting audio feature in a dialog detector in response to an input audio signal, the method comprising:
    extracting, by a frame feature extraction component, frame features from each frame of a plurality of frames divided from the input audio signal;
    determining, by a combo-term context determination component, a length or range of each context;
    deriving a relevant context feature based on the frame features in each determined context; and
    concatenating each context feature and forming a combined feature vector to represent a current frame.
2. The method of EEE 1, wherein the combo-term context includes:
    a short-term context, representing the local information around the current frame;
    a mid-term context, further containing a plurality of look-back frames; and
    a long-term context, further containing a plurality of long-term history frames.
3. The method of EEE 1 or 2, wherein the length or range of one or more contexts can be predetermined.
4. The method of EEE 2 or 3, wherein the short-term context contains the current frame and the look-ahead frames if the look-ahead buffer is available; or the short-term context contains the current frame and a first portion of the look-back frames if the look-ahead buffer is not available.
5. The method of EEE 2 or 3, wherein the mid-term context contains the current frame, the look-ahead frames and the look-back frames if the look-ahead buffer is available; or the mid-term context contains the current frame, the first portion of the look-back frames and a second portion of the look-back frames if the look-ahead buffer is not available.
6. The method of EEE 2 or 3, wherein the long-term context contains the current frame, the look-ahead frames, the look-back frames and long-term history frames if the look-ahead buffer is available; or the long-term context contains the current frame, the first portion of the look-back frames, the second portion of the look-back frames and the long-term history frames if the look-ahead buffer is not available.
7. The method of EEE 1 or 2, wherein the length or range of one or more contexts can be adaptively determined.
8. The method of EEE 7, wherein the length or range of one or more contexts can be adaptively determined by analyzing stationarity of frame-level features.
9. The method of EEE 8, wherein the adaptive determination of the length or range of one or more contexts is based on information related to amplitude of the input audio signal.
10. The method of EEE 2 or 9, wherein the adaptive determination of the length or range of short-term context comprises:
    computing short time energy of a frame of the plurality of frames of the input audio signal;
    smoothing the computed short time energy;
    determining a difference between the smoothed short time energy of the frame and the smoothed short time energy of a preceding frame;
    determining an onset based on whether the difference satisfies a threshold;
    normalizing the onset;
    determining a boundary for the length or range of the short-term context by one of the following steps:
        taking a position having the largest onset as the boundary; or
        taking a peak onset as the boundary based on whether the peak satisfies a threshold; or taking a peak onset as the boundary based on both the threshold and a distance between the onset and a strong transient immediately before the onset.
11. The method of EEE 8, wherein the adaptive determination of the length or range of one or more contexts is based on information related to spectrum of the input audio signal.
12. The method of EEE 2 or 11, wherein the adaptive determination of the length or range of short-term context comprises:
    supposing a timestamp in a Bayesian Information Criteria window as a true boundary for the length or range of the short-term context;
    supposing the timestamp in a Bayesian Information Criteria window as not the true boundary for the length or range of the short-term context;
    determining a difference Bayesian Information Criteria between the two hypotheses;
    normalizing the difference Bayesian Information Criteria; and
    considering a peak of difference Bayesian Information Criteria as the position of the true boundary for the length or range of the short-term context based on whether the peak satisfies a threshold.
13. The method of any one of the preceding EEEs 2, 7 to 12, wherein the short-term context can extend to both look-ahead and look-back directions, or extend to one direction only.
14. The method of any one of the preceding EEEs, wherein the length or range of the contexts can be predefined in combination with the adaptive determination.
15. A method of downmixing an input audio signal of a dialog detector, the method comprising:
    dividing an input audio signal into a plurality of frames;
    converting frames in a left channel and a right channel to spectrum representation of frames;
    removing uncorrelated signals in the left channel and the right channel by applying frequency dependent gains to the spectrum in the left channel and the right channel respectively;
    obtaining a downmixed signal, and
    feeding the downmixed signal to a dialog detector with the method of any one of the preceding EEEs 1 to 14.
16. The method of EEE 15, wherein the frequency dependent gains can be estimated from a covariance matrix.
17. A method of classifying an input audio signal of a dialog detector, the method comprising:
    receiving, by a speech content detector, features extracted according to the method of any one of the preceding EEEs 1 to 14;
    determining, by the speech content detector, a speech confidence score; and
    receiving, by a music content detector, features extracted according to the method of any one of the preceding EEEs 1 to 14;
    determining, by the music content detector, a music confidence score; and
    combining the speech confidence score and the music confidence score to obtain a final dialog confidence score.
18. The method of EEE 17, wherein the final dialog confidence score can be refined by a context-dependent parameter.
19. The method of EEE 18, wherein the context-dependent parameter can be computed based on proportion of frames identified as speech or music in a history context.
20. The method of EEE 19, wherein the history context can be as long as or longer than ten seconds.

What is claimed is:
1. A machine learning method of dialog detection, the method comprising:
    receiving an input audio signal and dividing the received input audio signal into a plurality of frames;
    extracting frame audio features from each frame;
    determining first, second, and third context windows for a current frame, each of the first, second, and third context windows including a different respective numberof frames adjacent to the current frame;
    deriving, for each of the first, second, and third context windows, a respective context audio feature for the current frame based on the frame audio features of the frames in each respective context window;
    generating a combined feature vector to represent the current frame, the generating including concatenating the respective context audio features of the first, second, and third context windows;
    obtaining a speech confidence score that represents a probability of presence of dialog in the current frame using the combined feature vector; and
    sending the current frame to an audio improving device for dialog enhancement when it is determined based on the obtained speech confidence score that dialog is present.
2. The method of claim 1,
    wherein the first context window includes the current frame and a number of frames preceding and/or succeeding the current frame;
    wherein the second context window includes the frames of the short term first context window and a plurality of look-back frames; and
    wherein the third context window includes the frames of the second context window and a plurality of long-term history frames.
3. The method of claim 1, wherein the respective number of frames in each of the first, second, and third context windows is predetermined.
4. The method of claim 1, wherein the first context window contains the current frame and a set of look-ahead frames from a look-ahead buffer.
5. The method of claim 1, wherein the respective number of frames in at least one of the first, second, and third context windows is adaptively determined based on the extracted frame audio features.
6. The method of claim 5, wherein the respective number of frames in the at least one of the first, second, and third context windows is adaptively determined by analyzing stationarity of frame-level audio features.
7. The method of claim 6, wherein the adaptive determination of respective the number of frames in the at least one of the first, second, and third context windows is based on information related to amplitude of the input audio signal.
8. The method of claim 6, wherein the adaptive determination of the number of frames in the at least one of the first, second, and third context windows is based on information related to spectrum of the input audio signal.
9. The method of claim 1, further comprising:
    converting frames in a left channel and a right channel to a spectrum representation of frames;

removing uncorrelated signals in the left channel and the right channel by applying frequency dependent gains to the spectrum representation in the left channel and the right channel, respectively;

obtaining a downmixed signal from the left and right channels; and using said downmixed signal as said input audio signal.

10. The method of claim 9, wherein the frequency dependent gains are estimated from a covariance matrix.

11. A method of classifying an input audio signal of a dialog detector, the method comprising:

obtaining the speech confidence score according to the method of claim 1;

determining a music confidence score based on the combined feature vector; and combining the speech confidence score and the music confidence score to obtain a final dialog confidence score.

12. The method of claim 11, wherein the final dialog confidence score is refined by a context-dependent parameter.

13. The method of claim 12, wherein the context-dependent parameter is computed based on proportion of frames identified as speech or music in a history context window, that is at least ten seconds long.

14. A dialog detector comprising means for performing the method according to claim 1.

15. A non-transitory computer readable storage medium having stored thereon instructions that, when executed by a computer, cause the computer to perform the method according to claim 1.

16. A method of obtaining a confidence score that represents a probability of presence of dialog in a current frame of an input audio signal, the method comprising:

dividing the input audio signal into a plurality of frames;

extracting frame audio features from each frame;

determining a set of context windows, each context window including a number of frames surrounding the current frame;

deriving, for each context window, a relevant context audio feature for the current frame based on the frame audio features of the frames in each respective context;

concatenating each context audio feature to form a combined feature vector to represent the current frame;

obtaining a speech confidence score that represents a probability of presence of dialog in the current frame using the combined feature vector;

converting frames in a left channel and a right channel to a spectrum representation of frames;

removing uncorrelated signals in the left channel and the right channel by applying frequency dependent gains to the spectrum representation in the left channel and the right channel, respectively;

obtaining a downmixed signal from the left and right channels; and using said downmixed signal as said input audio signal.

17. The method of claim 16, wherein the frequency dependent gains are estimated from a covariance matrix.

* * * * *

UNITED STATES PATENT AND TRADEMARK OFFICE
CERTIFICATE OF CORRECTION

| | | |
|---|---|---|
| PATENT NO. | : 12,118,987 B2 | Page 1 of 1 |
| APPLICATION NO. | : 17/604379 | |
| DATED | : October 15, 2024 | |
| INVENTOR(S) | : Lu et al. | |

It is certified that error appears in the above-identified patent and that said Letters Patent is hereby corrected as shown below:

On the Title Page

Column 1, Item (73) ASSIGNEE:
Line 2, After "Corporation", insert --, San Francisco,--

Column 1, Item (73) ASSIGNEE:
Line 2, After "CA", insert --(US)--

Column 1, Item (30) FOREIGN APPLICATION PRIORITY DATA:
Line 1, Delete "(WO)" and insert --(CN)--

In the Claims

Column 14, Line 16-17, Claim 1, delete "numberof" and insert --number of--

Column 14, Line 38, Claim 2, before "first", delete "short term"

Column 13, Line 23, Claim 13, delete "window," and insert --window--

Signed and Sealed this
Seventeenth Day of June, 2025

Coke Morgan Stewart
*Acting Director of the United States Patent and Trademark Office*